Figure 7:
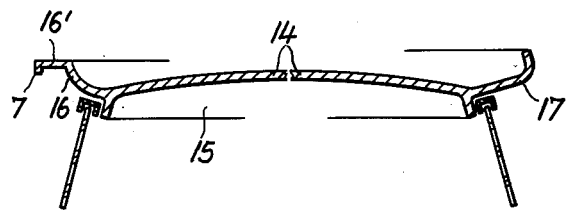

Dec. 3, 1963            B. BARÉNYI            3,112,952
PASSENGER CAR WITH SUBSTANTIALLY FLAT TOP
Filed June 30, 1959            2 Sheets-Sheet 1
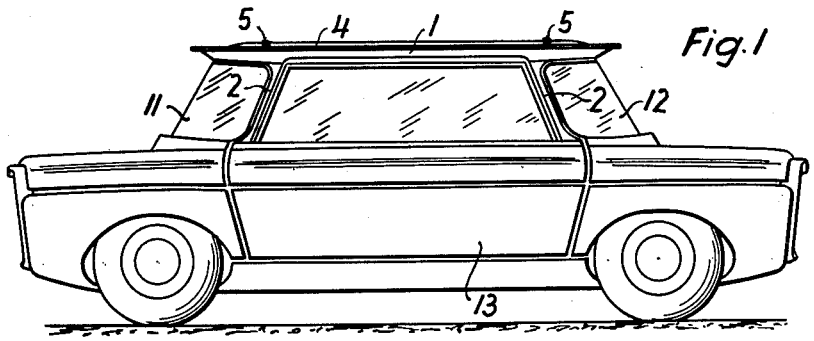
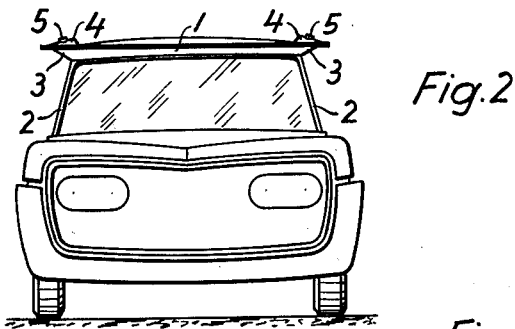
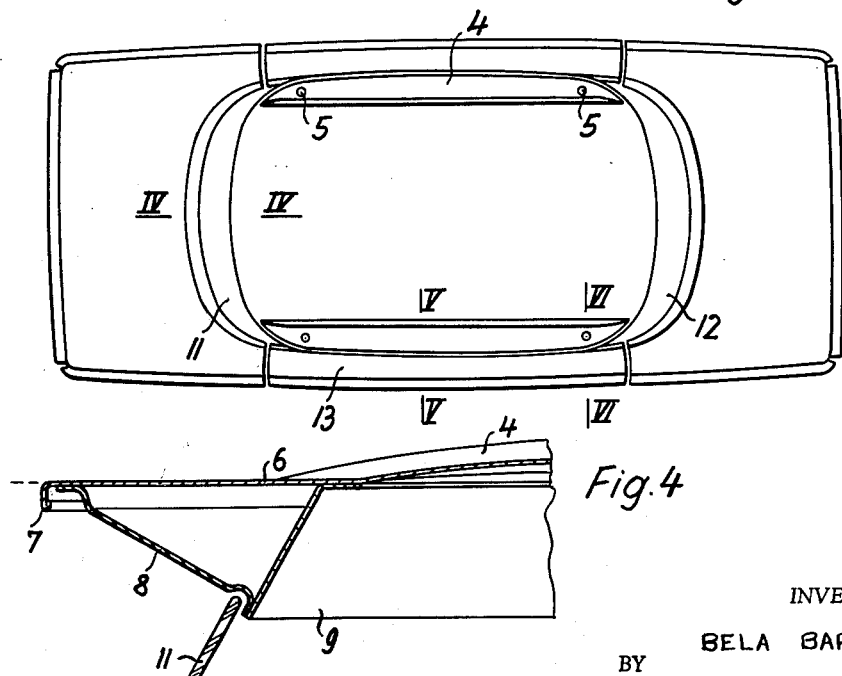
INVENTOR.
BELA BARÉNYI
BY
Dicke, Craig and Freudenberg
ATTORNEYS Dec. 3, 1963   B. BARÉNYI   3,112,952
PASSENGER CAR WITH SUBSTANTIALLY FLAT TOP
Filed June 30, 1959   2 Sheets-Sheet 2

INVENTOR.
BELA BARÉNYI
BY
Dicke, Craig and Freudenberg
ATTORNEYS

United States Patent Office 3,112,952
Patented Dec. 3, 1963

3,112,952
PASSENGER CAR WITH SUBSTANTIALLY FLAT TOP
Béla Barényi, Stuttgart-Vaihingen, Germany, assignor to Daimler-Benz Aktiengesellschaft, Stuttgart-Unterturkheim, Germany
Filed June 30, 1959, Ser. No. 823,918
Claims priority, application Germany July 1, 1958
1 Claim. (Cl. 296—137)

The present invention relates to a new construction of a passenger automobile with a closed upper body, the top of which is substantially flat and supported by at least four posts.

It is the principal object of the present invention to provide a new construction of a passenger automobile the top of which is especially designed for carrying baggage and other goods and is for this purpose provided with suitable projections, ridges, corrugations, and the like and the loading surface of which is limited in lateral directions to prevent the baggage or the like from sliding off the car top.

A further object of the invention is to provide the car top with suitable longitudinal reinforcements which extending at least from one supporting post to the other without projecting toward the inside of the car body. Still another object of the invention is to design the mentioned ridges, corrugations or the like in a manner so as to prevent rain water or melted snow which might collect on the car top from running or dripping laterally off the car top at a point directly above the doors of the car.

The car top according to the invention is provided with an outwardly projecting, eaveslike edge portion extending beyond the contours of the upper car body. This edge portion is designed also to carry the upward ridges, corrugations or the like which limit the loading surface. It is preferably made in the form of a closed hollow body and may also be utilized for supporting an additional baggage rack in the form of rods which may be inserted into suitable apertures or pipe sockets within the hollow body of the edge portion. The upwardly extending ridge limiting the loading surface may, however, also be produced by bending the edge portions of the plate forming the car top upwardly, while the eaveslike edge portion may be produced by securing at least one strip of an angular cross section at one side to the upwardly bent edge of the top plate and at the other side of the lower surface of this plate so that the angular strip together with the upwardly bent edge portion of the plate form a hollow body.

The upwardly extending ridges or corrugations preferably extend only in the longitudinal direction along both sides of the car top. Near the front and rear ends of the latter, they preferably are tapered down in height so as to merge gradually into the surface of the car top. The car top may be further reinforced by providing thereon a plurality of riblike corrugations extending in the longitudinal direction of the car, and if desired, it may also be reinforced by connecting the upward ridges on the eaveslike edge portions by means of transverse connecting members. Instead of extending the ridges or corrugations which limit the loading surface only along both sides of the car top, they may, however, also extend on the eaveslike edge portions all around the car top or be U-shaped, as seen in a plan view, so that the lateral projections or ridges will be connected at least at one end by a transverse ridge.

These and additional objects, features, and advantages of the present invention will become further apparent from the following detailed description thereof, particularly when read with reference to the accompanying diagrammatical drawings, in which—

Figure 8:
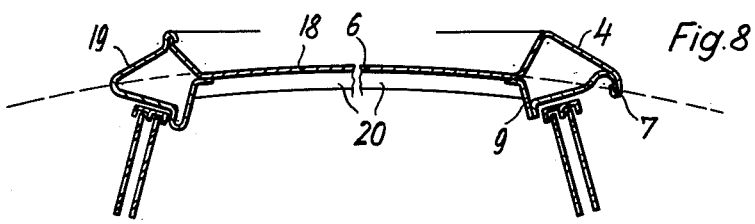
Figure 9:
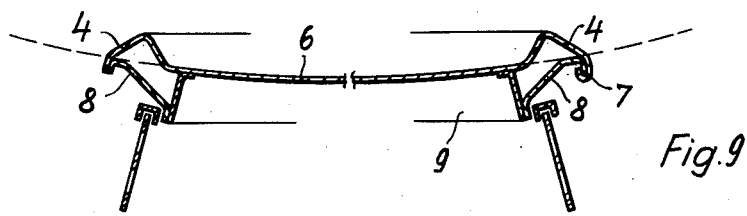
Figure 5:
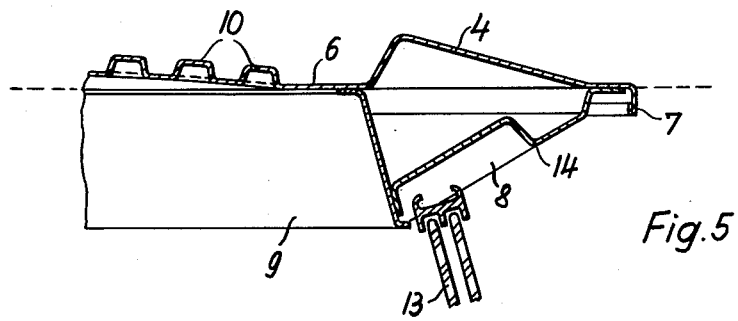
Figure 6:
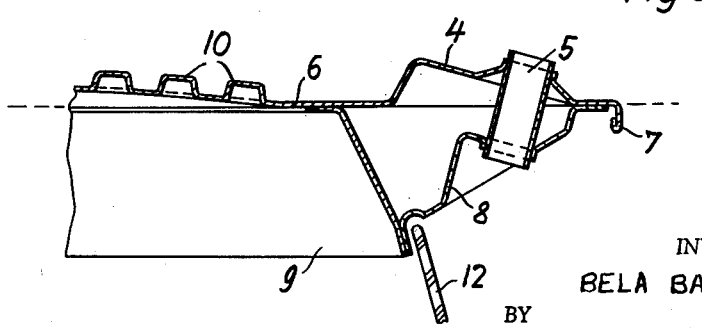

FIGURE 1 shows a side view of a passenger car according to the invention;
FIGURE 2 shows a front view thereof;
FIGURE 3 shows a top plan view thereof;
FIGURE 4 shows a cross section taken along line IV—IV of FIGURE 3;
FIGURE 5 shows a cross section taken along line V—V of FIGURE 3;
FIGURE 6 shows a cross section taken along line VI—VI of FIGURE 3;
FIGURE 7 shows a central transverse cross section of a car top made, for example, of plastic, and illustrates two different modifications of the lateral edge portions of the car top at the left and right sides of this drawing; while
FIGURES 8 and 9 show further cross sections similar to FIGURE 7, each illustrating further modifications of and lateral edge portions of the car top at the left and right sides of each drawing.

In the drawings, FIGURES 1 to 3 illustrate a passenger car with a substantially pontoon-shaped lower body and a closed upper body which has an only slightly curved top 1 supported on four posts 2. This car top 1 is provided with a continuous edge portion 3 which projects like the eaves of a roof on all sides outwardly over the contours of the upper end of the upper car body as defined by posts 2 and the front and rear windows 11 and 12. On its upper side, this projecting edge portion 3 is provided along the lateral sides with upwardly projecting corrugations 4 which slope downwardly at a steep angle at the side facing toward the center of the car top 1 and at a wide angle toward the outer edge, and gradually decrease in height near their ends so as to merge into the main upper surface of the car top. On each side of the car top 1 near the opposite ends thereof, a pair of pipe sockets 5 are mounted within the upwardly projecting corrugations 4. These sockets are provided for inserting the posts of a luggage retaining frame or rack, not shown.

FIGURES 4 to 6 show detail views of the car top in which the sheet-metal plate 6 forming the actual top surface is bent over downwardly along the entire outer edge to form a drip ledge 7. The outwardly projecting edge portion 3 is formed by two sheet-metal strips 8 and 9 which together with the top plate 6 form an annular chamber of a substantially triangular cross-sectional shape pointing toward the outside. Along its longitudinal edges, top plate 6 is bent upwardly to form the two corrugations 4, while between these corrugations 4 top plate 6 is bent to form a plurality of smaller corrugations 10 which extend in the longitudinal direction. The front and rear windows of the car are indicated in FIGURES 4 and 6 at 11 and 12, respectively. The upper car body is closed at each side by a door which, as indicated in FIGURE 5, is preferably designed in the form of a sliding door 13. For accommodating this door 13, the sheet-metal strip 8 is provided with a recess, the upper edge 14 of which forms a second drip edge above door 13. FIGURE 6 illustrates the manner of mounting one of the pipe sockets 5 in the edge portion 3. These sockets are preferably outwardly inclined.

In the modification of the invention as shown in FIGURE 7, the car top including its outwardly projecting edge portion is made of a single piece of material, preferably a suitable plastic. It consists of a slightly convex central part 14 with an annular flange 15 along its outer edges which projects downwardly into the interior of the upper car body. FIGURE 7 illustrates at the left and right sides two different embodiments of the lateral upwardly projecting edge portions or ridges. At the left side of FIGURE 7, the longitudinal edge of the central part 14 is extended laterally to form an outwardly projecting edge portion 16 which is curved upwardly and then continues at 16' into a horizontal portion which may terminate in an outer drip edge 7. In the embodiment at the right side of FIGURE 7, the longitudinal edge of the central part 14 is extended outwardly to form an annular portion 17, the edge portion of which is bent upwardly and thus forms a rim around the central part 14.

The two modifications of the car top as illustrated at the left and right sides of FIGURE 8 are preferably made of sheet-metal and their outer edge portions are hollow. The car top at the left side of FIGURE 8 consists of a slightly convex central plate 18, the outer edge of which is bent upwardly at a steep angle. At the outer upper ends of plate 18, the same is secured to one edge of a portion 19 of an annular cross section, the other edge of which is secured to the lower side of plate 18, for example, by welding. This angular portion 19 together with the upwardly bent edge of plate 18 forms the longitudinal corrugation 4 of the car top and also the continuous edge portion 3 as shown in FIGURES 1 to 3. The embodiment at the right side of FIGURE 8 is similar to that according to FIGURE 5 insofar as the entire corrugation 4 is an integral part of plate 6. The outer, downwardly bent edge of plate 6 is secured to one edge of a strip 8 and the interconnected edge portions are bent so as to form the drip edge 7. The other edge of strip 8 is connected to the lower side of plate 6 by a connecting strip 9. Of course, in place of two strips 8 and 9 a single strip may be used which is bent accordingly and is similarly secured to the outer edge and the lower side of plate 6. Plate 6 together with the single or double strip 8, 9 again form the continuous hollow edge portion 3.

In the embodiments according to FIGURE 8, the corrugation 4 surrounds the central part 6 or 18 at least along three sides and thus is substantially U-shaped, as seen in a plan view, or it may have ringlike shape. The longitudinal sides of the edge portion 3 of the car top are connected by transverse bars or strips 20 which support the central part 6 or 18 of the top.

The embodiment of the invention according to FIGURE 9 differs from the embodiments as last described materially only insofar as the central top plate 6 has a concave curvature and the strip 9 forms a continuous closed rim. In all of the embodiments as shown in the drawings which are made of sheet-metal, the individual parts may be secured to each other either by welding, flanging, or beading over.

Although my invention has been illustrated and described with reference to the preferred embodiments thereof, I wish to have it understood that it is in no way limited to the details of such embodiments, but is capable of numerous modifications within the scope of the appended claim.

Having thus fully described my invention, what I claim is:

In a passenger car having a closed upper body, a roof for said body having lateral edge portions and a substantially horizontally disposed intermediate portion, said lateral edge portions including angularly related upwardly and downwardly extending portions integral with said intermediate portion, said upwardly extending portions being angularly inclined to said intermediate portion, said downwardly extending portions being provided with bent edge portions, wall portions disposed below and cooperating with said roof to form therewith hollow longitudinally extending lateral closed rim members, said wall portions comprising an upwardly and outwardly inclined strip member having an edge portion secured to said bent edge portions, said wall portions further comprising a connecting strip member having one longitudinal edge thereof secured to said roof and another longitudinal edge thereof secured to a further edge portion of said upwardly and outwardly inclined strip member, said upwardly and outwardly inclined strip member and said downwardly extending portions being provided with pairs of registering apertures, and pipe socket members for supporting rod-like means secured in said apertures.

References Cited in the file of this patent

UNITED STATES PATENTS

| | | |
|---|---|---|
| 1,090,985 | Hopkins | Mar. 24, 1914 |
| 1,703,118 | McCulley et al. | Feb. 26, 1929 |
| 1,896,628 | Jedsen | Feb. 7, 1933 |
| 2,481,868 | Philip | Sept. 13, 1949 |
| 2,576,354 | Oswald | Nov. 27, 1951 |
| 2,643,913 | Lyon | June 30, 1953 |
| 2,991,121 | Barenyi | July 4, 1961 |
| 3,008,760 | Barenyi | Nov. 14, 1961 |
| 3,019,049 | Barenyi | Jan. 30, 1962 |

FOREIGN PATENTS

| | | |
|---|---|---|
| 155,889 | Great Britain | Dec. 17, 1920 |
| 513,140 | Great Britain | Oct. 4, 1939 |
| 685,786 | France | Apr. 7, 1930 |
| 1,183,831 | France | Feb. 2, 1959 |